United States Patent
Furuta et al.

(10) Patent No.: US 10,684,248 B2
(45) Date of Patent: Jun. 16, 2020

(54) GAS SENSOR

(71) Applicant: NGK Spark Plug Co., LTD., Nagoya (JP)

(72) Inventors: Hitoshi Furuta, Tajimi (JP); Masaki Nakagawa, Komaki (JP)

(73) Assignee: NGK Spark Plug Co., LTD., Nagoya (JP)

( * ) Notice: Subject to any disclaimer, the term of this patent is extended or adjusted under 35 U.S.C. 154(b) by 70 days.

(21) Appl. No.: 15/843,990

(22) Filed: Dec. 15, 2017

(65) Prior Publication Data
US 2018/0172622 A1    Jun. 21, 2018

(30) Foreign Application Priority Data

Dec. 19, 2016 (JP) .................. 2016-245439
Dec. 12, 2017 (JP) .................. 2017-237622

(51) Int. Cl.
*G01N 27/406* (2006.01)
*G01N 27/407* (2006.01)
*G01N 27/41* (2006.01)

(52) U.S. Cl.
CPC ..... *G01N 27/4067* (2013.01); *G01N 27/4065* (2013.01); *G01N 27/4071* (2013.01); *G01N 27/4077* (2013.01); *G01N 27/41* (2013.01)

(58) Field of Classification Search
CPC ..... G01N 27/41; G01N 27/406; G01N 27/407
See application file for complete search history.

(56) References Cited

U.S. PATENT DOCUMENTS

| 8,001,827 B2 * | 8/2011 | Weyl ................. | G01N 27/4077 73/23.31 |
| 2015/0276658 A1 * | 10/2015 | Okazaki ............ | G01N 27/4071 204/431 |
| 2015/0355142 A1 * | 12/2015 | Murakami ......... | G01N 27/4071 324/464 |

FOREIGN PATENT DOCUMENTS

JP    2012-018050 A    3/2009

* cited by examiner

*Primary Examiner* — Luan V Van
*Assistant Examiner* — Caitlyn Mingyun Sun
(74) *Attorney, Agent, or Firm* — Leason Ellis LLP

(57) ABSTRACT

An NOx sensor includes a gas sensor element, a body member made of metal, and a protector made of metal. The body member is formed into a tubular shape extending in an axial direction and accommodates a gas sensor element internally of the same. The NOx sensor is formed into a tubular shape extending in the axial direction and includes an attachment member disposed such that a space extending in the axial direction is formed between the attachment member and the body member. The gas sensor element includes an oxygen concentration detection cell having an oxygen ion-conductive solid electrolyte layer and a detection electrode and a reference electrode formed on the solid electrolyte layer and forming a pair, and a heater for heating the oxygen concentration detection cell to a predetermined temperature. The oxygen concentration detection cell is disposed in the space.

6 Claims, 3 Drawing Sheets

GAS SENSOR

This application claims the benefit of Japanese Patent Applications No. 2016-245439 Dec. 19, 2016 and No. 2017-237622 Dec. 12, 2017, all of which are incorporated herein by reference in their entirety.

FIELD OF THE INVENTION

The present disclosure relates to a gas sensor for detecting a particular gas contained in a gas under measurement.

BACKGROUND OF THE INVENTION

As described in Japanese Patent Application Laid-Open (kokai) No. 2012-18050, there is known a gas sensor capable of detecting the concentration of a particular gas contained in a gas under measurement by heating the gas sensor to a predetermined activation temperature or higher. Such a gas sensor has a heater for bringing the gas sensor into a condition capable of detecting a particular-gas concentration (i.e., an activated condition) at an early stage after start-up.

The internal resistance of a detection element formed by use of a solid electrolyte body has a characteristic of changing in correlation with the temperature of the detection element. Thus, a sensor control apparatus for controlling the detection element detects the internal resistance and drives the heater on the basis of a temperature calculated by use of the detected internal resistance, thereby heating the detection element to a target temperature.

Problems to be Solved by the Invention

However, when the temperature of the detection element deviates from a target temperature as a result of an ambient temperature change of a gas sensor, accuracy in detecting the concentration of the particular gas by the gas sensor may lower.

An object of the present disclosure is to restrain a temperature change of the detection element.

SUMMARY OF THE INVENTION

Means for Solving the Problems

One mode of the present disclosure is a gas sensor comprising a detection element, an accommodation member made of metal, and a protector made of metal. The detection element is formed in an elongated shape and detects a particular gas contained in a target gas. The accommodation member is formed in a tubular shape extending in an axial direction for accommodating the detection element inside thereof.

The protector has a gas passage hole formed therein for allowing passage of the target gas and is fixed to the accommodation member in such a manner as to cover a forward end of the detection element.

The gas sensor of the present disclosure further comprises a space formation member formed in a tubular shape extending in the axial direction and disposed such that an annular or non-endless annular space extending in the axial direction is formed between the space formation member and the accommodation member.

The detection element comprises a detection cell having an oxygen ion-conductive solid electrolyte body and a pair of electrodes formed on the solid electrolyte body, and a heater for heating the detection cell to a predetermined temperature. The detection cell is disposed internally of the space. Notably, the expression "disposed internally of the space" means to be disposed radially inward of the space.

In the thus-configured gas sensor of the present disclosure, the detection cell is covered in a surrounded manner with a section where the space formation member, the space, and the accommodation member made of metal are radially stacked (hereinafter, called the "stack section").

Thus, one channel through which an ambient temperature change of the gas sensor affects the temperature of the detection cell of the gas sensor is a channel through which ambient heat of the gas sensor is conducted to the detection cell by way of the above-mentioned stack section.

In the stack section, the space is formed between the space formation member and the accommodation member. That is, gas is present between the space formation member and the accommodation member made of metal. Gas is lower in thermal conductivity than metal. Thus, in the gas sensor of the present disclosure, ambient heat of the gas sensor is unlikely to be conducted to the detection cell by way of the stack section, whereby a temperature change of the detection cell can be restrained. As a result of a temperature change of the detection cell being restrained, a temperature change of the detection element can be restrained.

In the one mode of the present disclosure, the space formation member may be disposed in such a manner as to cover at least a portion of an outer circumferential surface of the accommodation member while the space is formed between the space formation member and the accommodation member. Also, in the one mode of the present disclosure, the space formation member may be disposed within the accommodation member in such a manner as to cover at least a portion of an inner circumferential surface of the accommodation member while the space is formed between the space formation member and the accommodation member.

In the one mode of the present disclosure, the detection element may comprise a measurement chamber, a pumping cell, and an oxygen concentration detection cell; the oxygen concentration detection cell may be the detection cell; and the pumping cell may be disposed on a forward end side of the detection element with respect to the oxygen concentration detection cell and disposed within the accommodation member. The target gas is introduced into the measurement chamber. The pumping cell has an oxygen ion-conductive first solid electrolyte body and a pair of pumping electrodes formed on the first solid electrolyte body and pumps oxygen from or to the target gas introduced into the measurement chamber when a pumping current flows between the pair of pumping electrodes. The oxygen concentration detection cell has an oxygen ion-conductive second solid electrolyte body, and a detection electrode and a reference electrode formed on the second solid electrolyte body, has the detection electrode disposed in such a manner as to face the measurement chamber, and generates an electromotive force proportional to a difference in oxygen concentration between the detection electrode and the reference electrode.

In the thus-configured gas sensor of the present disclosure, since the pumping cell is disposed within the accommodation member, the pumping cell is radially covered with the accommodation member. As a result, in the gas sensor of the present disclosure, the accommodation member can restrain ambient heat of the gas sensor from reaching the pumping cell. Thus, the gas sensor of the present disclosure can further restrain a temperature change of the detection element.

BRIEF DESCRIPTION OF THE DRAWINGS

These and other features and advantages of the present invention will become more readily appreciated when considered in connection with the following detailed description and appended drawings, wherein like designations denote like elements in the various views, and wherein.

DETAILED DESCRIPTION OF THE INVENTION (First Embodiment)

An embodiment of the present disclosure will next be described with reference to the drawings.

An NOx sensor 1 of the present embodiment is mounted in a vehicle and detects nitrogen oxides (hereinafter, NOx) contained in exhaust gas emitted from an internal combustion engine.

Figure 1:
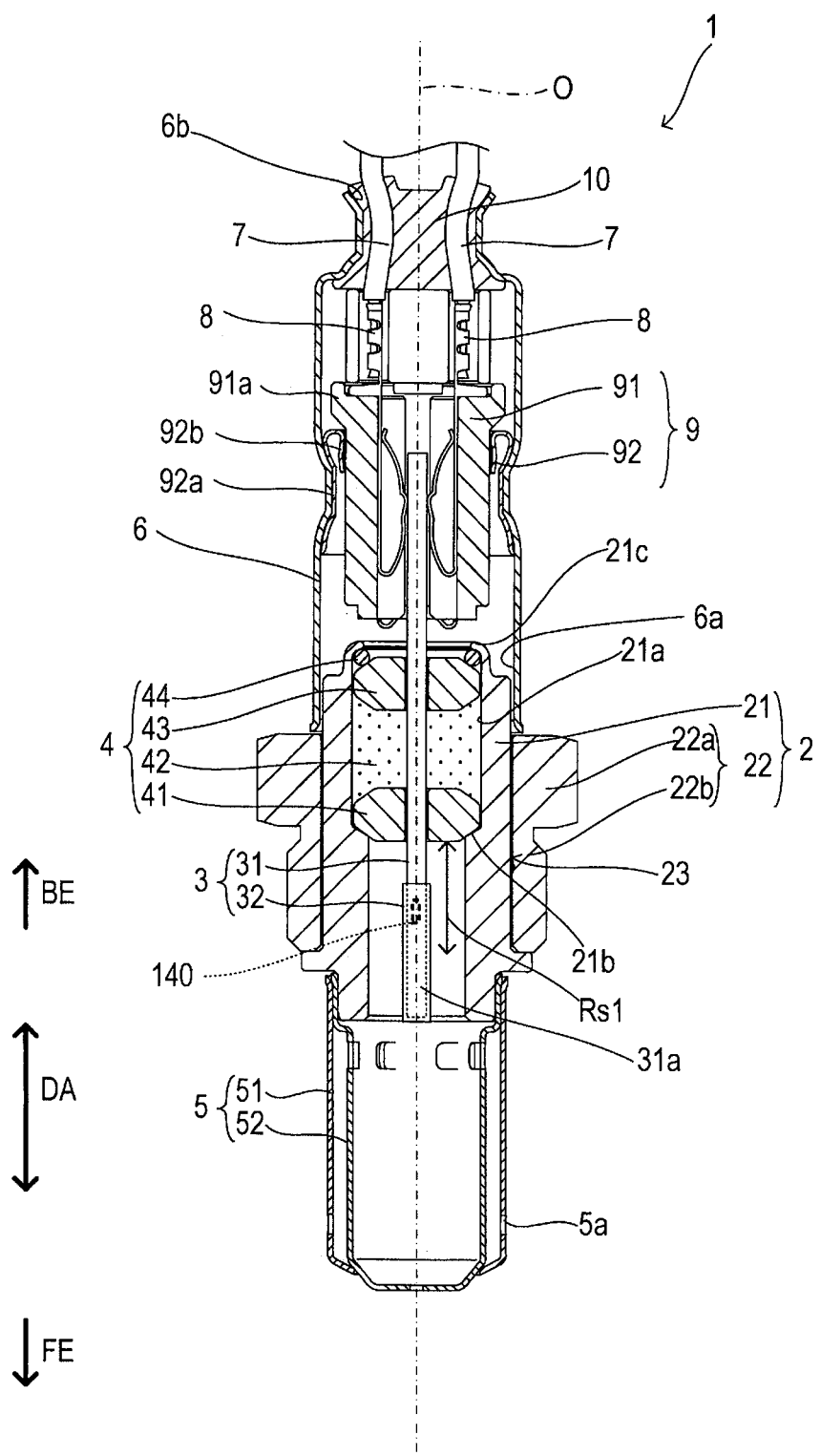
FIG. 1 is a sectional view of an NOx sensor 1.

As shown in FIG. 1, the NOx sensor 1 includes a metallic shell 2, a gas sensor element 3, a holding section 4, a protector 5, an outer tube 6, a plurality of lead wires 7, a plurality of connection terminals 8, a separation section 9, and a grommet 10. In FIG. 1, the lower end side of the NOx sensor 1 is called a forward end side FE, and the upper end side of the NOx sensor 1 is called a rear end side BE.

The metallic shell 2 is a tubular member formed of a refractory metal such as stainless steel. The metallic shell 2 includes a body member 21 and an attachment member 22.

The body member 21 is a cylindrical member extending in a direction of an axial line O (hereinafter, called an axial direction DA) of the NOx sensor 1. The body member 21 has a through hole 21a extending therethrough along the axial direction DA. The body member 21 has a step portion 21b protruding radially inward from the inner circumferential wall of the through hole 21a.

The attachment member 22 is a tubular member which surrounds the body member 21 in such a manner as to be rotatable in relation to the body member 21, and includes a hexagonal portion 22a and a threaded portion 22b. A cylindrical space 23 extending in the axial direction DA is formed between an outer circumferential surface of the body member 21 and an inner circumferential surface of the attachment member 22. The space 23 is a non-endless annular, radially closed space. More specifically, in the sectional view of FIG. 1, the space 23 is formed uniformly while having predetermined thicknesses in the axial direction and the radial direction, respectively; however, the inner circumferential surface of the attachment member 22 and the outer circumferential surface of the body member 21 are partly in contact with each other. Therefore, the space 23 has a non-endless annular shape (a shape resembling the letter C).

The hexagonal portion 22a extends radially outward of the outer circumference of the body member 21 and has a plate-like shape having a hexagonal periphery. In attaching the NOx sensor 1 to an exhaust pipe, an attachment tool such as a hexagonal wrench is fitted to the hexagonal portion 22a.

The threaded portion 22b is located on the forward end side FE of the hexagonal portion 22a, extends radially outward of the outer circumference of the body member 21, and has an external thread formed on its outer circumference. The external thread is formed in such a manner as to be engaged with a threaded attachment hole formed in the exhaust pipe of an internal combustion engine for allowing the NOx sensor 1 to be attached to the exhaust pipe.

The gas sensor element 3 includes an element body 31 and a protection layer 32. The element body 31 has an elongated plate-like shape extending in the axial direction DA. The element body 31 has a detection section 31a formed at its forward end side FE and adapted to detect the concentration of a particular gas (in the present embodiment, NOx) contained in a gas under measurement (or "target gas," in the present embodiment, exhaust gas of an internal combustion engine) to which the gas sensor element 3 is exposed. The protection layer 32 is formed of porous alumina and disposed at the forward end side FE of the element body 31 in such a manner as to cover at least the detection section 31a.

The holding section 4 includes a ceramic holder 41, talc powder 42, a ceramic sleeve 43, and a packing 44.

The ceramic holder 41 is an approximately cylindrical alumina member which can be accommodated in the through hole 21a of the body member 21 while being supported by the step portion 21b of the body member 21. The ceramic holder 41 has a through hole extending therethrough along the axial direction DA, and the gas sensor element 3 is inserted through the through hole.

The talc powder 42 is filled into the through hole 21a of the body member 21 in a region located on the rear end side BE of the ceramic holder 41.

The ceramic sleeve 43 is an approximately cylindrical alumina member which can be accommodated in the through hole 21a of the body member 21. The ceramic sleeve 43 has a through hole extending therethrough along the axial direction DA, and the gas sensor element 3 is inserted through the through hole. Thus, the ceramic sleeve 43 is accommodated in the through hole 21a of the body member 21 in a region located on the rear end side BE of the talc powder 42.

The packing 44 is an annular member which can be accommodated in the through hole 21a of the body member 21. The packing 44 is disposed between the ceramic sleeve 43 and a rear end side BE end portion 21c of the body member 21. The end portion 21c of the body member 21 is crimped in such a manner as to press the ceramic sleeve 43 toward the forward end side FE through the packing 44. As a result, the talc powder 42 is compressed, and the holding section 4 holds the gas sensor element 3 in a condition such that the forward end side FE of the gas sensor element 3 protrudes from the forward end side FE of the ceramic holder 41, whereas the rear end side BE of the gas sensor element 3 protrudes from the rear end side BE of the metallic shell 2.

The step portion 21b of the body member 21 is disposed on the rear end side BE of the threaded portion 22b. As a result, the holding section 4 is accommodated in the through hole 21a of the body member 21 on the rear end side BE of the threaded portion 22b. Accordingly, the holding section 4 holds the gas sensor element 3 while the detection section 31a is disposed within the through hole 21a on the forward end side FE of the step portion 21b.

Further, an oxygen concentration detection cell 140, which will be described herein later, provided within the detection section 31a is disposed within the through hole 21a of the body member 21 within a range Rs1 where the space 23 is present along the axial direction DA on the forward end side FE of the holding section 4. Notably, the length in the radial direction of the through hole 21a (i.e., the inside diameter of the through hole 21a) within the range Rs1 is greater than the length in the radial direction of the threaded portion 22b (i.e., the thickness of the threaded portion 22b) of the body member 21 within the range Rs1.

The protector 5 is a tubular metal member which covers a forward end side FE end portion of the gas sensor element 3 protruding from the metallic shell 2. The protector 5 has a plurality of gas introduction holes 5a formed therein. The protector 5 is joined by welding to the outer circumference of a forward end side FE end portion of the metallic shell 2.

The protector 5 has a dual structure consisting of an outer protector 51 and an inner protector 52. The closed-bottomed cylindrical inner protector 52 is disposed inside the closed-bottomed cylindrical outer protector 51.

The outer tube 6 is a tubular metal member extending in the axial direction DA. The outer tube 6 is fixed in a condition such that a portion of the body member 21 of the metallic shell 2 that is located on the rear end side BE of the attachment member 22 is fitted into a forward end side FE end opening portion 6a of the outer tube 6.

Figure 2:
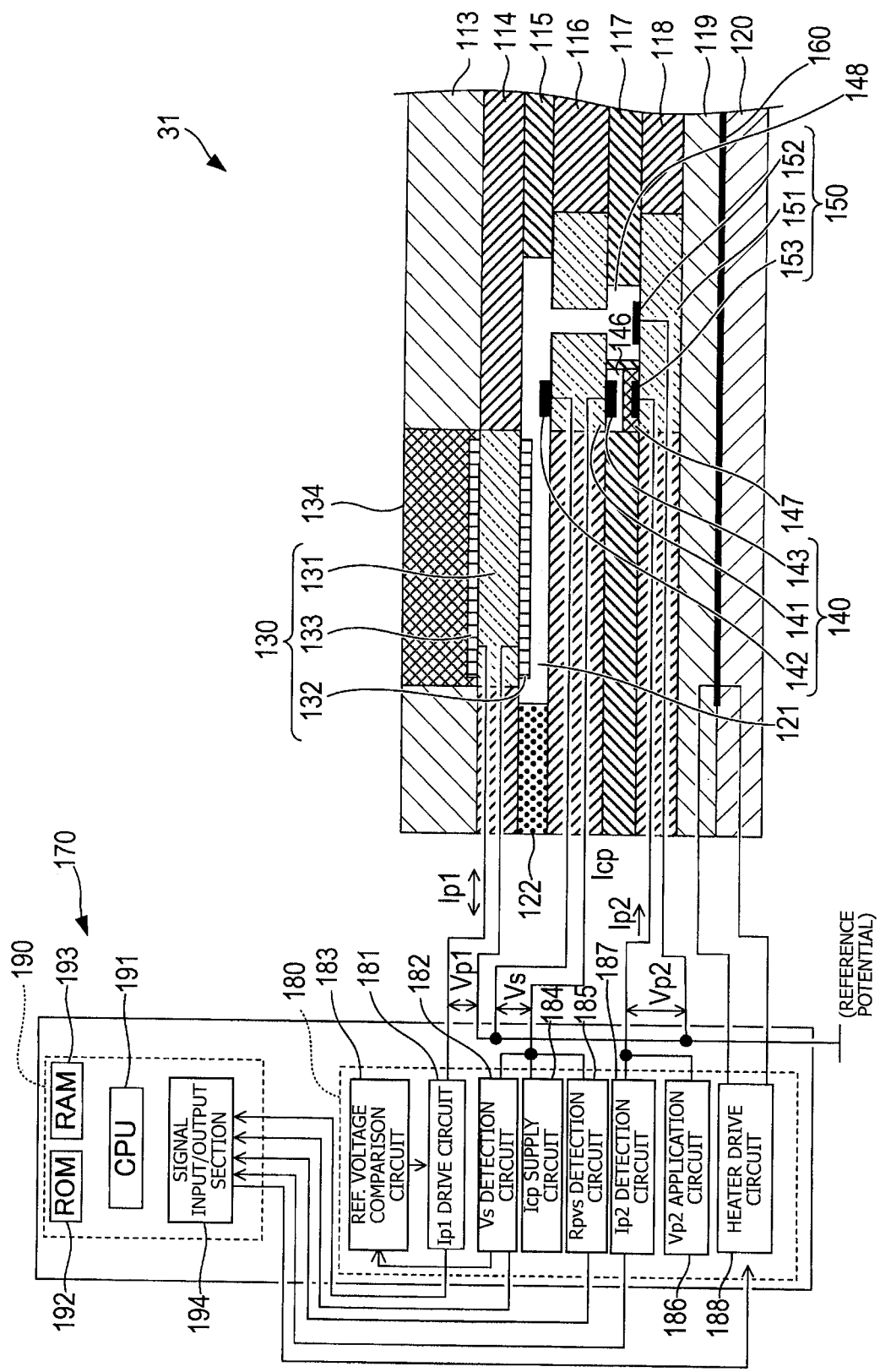
FIG. 2 is an illustration showing the schematic configuration of an element body 31 and a sensor control apparatus 170.

A plurality of the lead wires 7 correspond to a plurality of unillustrated electrode pads, respectively, formed at the rear end side BE of the element body 31 and electrically connect the element body 31 and a sensor control apparatus 170 for driving and controlling the gas sensor element 3. Notably, FIG. 1 shows two of the lead wires 7. The sensor control apparatus 170 is not shown in FIG. 1, but is shown in FIG. 2.

A plurality of the connection terminals 8 correspond to a plurality of the lead wires 7, respectively, and are connected to one end portions of the corresponding lead wires 7.

The separation section 9 includes a separator 91 and a holding member 92. The separator 91 is a cylindrical ceramic member extending in the axial direction DA and is disposed within the outer tube 6. The separator 91 has an interior space for accommodating a plurality of the connection terminals 8 and a rear end side BE portion of the element body 31. The separator 91 accommodates a plurality of the connection terminals 8 while maintaining a condition in which rear end side BE end portions of the connection terminals 8 protrude from the rear end side BE of the separator 91, and a plurality of the connection terminals 8 do not come into contact with one another. The separator 91 also maintains a condition in which a plurality of the connection terminals 8 are in contact with corresponding electrode pads of the element body 31. The separator 91 has a collar portion 91a extending radially outward from the outer circumferential surface of a rear end side BE end portion thereof.

The holding member 92 includes a body portion 92a and a curved portion 92b. The body portion 92a is a tubular metallic member extending in the axial direction DA. The curved portion 92b extends from the rear end side BE of the body portion 92a and is bent into a shape resembling the letter U. The holding member 92 is disposed in such a manner as to be located on the forward end side FE of the collar portion 91a between the outer tube 6 and the separator 91. As a result, the body portion 92a comes into contact with the inner circumferential surface of the outer tube 6, and the curved portion 92b presses the collar portion 91a of the separator 91 radially inward. Accordingly, the separator 91 is held within the outer tube 6 by means of the holding member 92.

The grommet 10 is a cylindrical elastic member formed of fluororubber and extending in the axial direction DA. The grommet 10 has a plurality of through holes extending therethrough in the axial direction DA. A plurality of the through holes correspond to a plurality of the above-mentioned lead wires 7, respectively, and allow the corresponding lead wires 7 to be inserted therethrough.

The grommet 10 is disposed internally of a rear end side BE end opening portion 6b of the outer tube 6 and crimped radially through the outer tube 6. As a result, the rear end side BE end opening portion 6b of the outer tube 6 is closed.

As shown in FIG. 2, the element body 31 of the gas sensor element 3 is formed by sequentially stacking an insulating layer 113, a ceramic layer 114, an insulating layer 115, a ceramic layer 116, an insulating layer 117, a ceramic layer 118, an insulating layer 119, and an insulating layer 120. The insulating layers 113, 115, 117, 119, and 120 are formed mainly of alumina.

The element body 31 includes a first measurement chamber 121 formed between the ceramic layer 114 and the ceramic layer 116. In the element body 31, the exhaust gas is introduced from the outside into the interior of the first measurement chamber 121 through a diffusion resistor 122 that is disposed between the ceramic layer 114 and the ceramic layer 116 so as to be adjacent to the first measurement chamber 121. The diffusion resistor 122 is formed of a porous material such as alumina.

The element body 31 includes a first pumping cell 130. The first pumping cell 130 includes a solid electrolyte layer 131 and pumping electrodes 132 and 133.

The solid electrolyte layer 131 is formed mainly of zirconia having oxygen ion conductivity. A part of the ceramic layer 114 is removed from a region in contact with the first measurement chamber 121, and the resulting space is filled with the solid electrolyte layer 131 instead of the ceramic layer 114.

The pumping electrodes 132 and 133 are formed mainly of platinum. The pumping electrode 132 is disposed on a surface of the solid electrolyte layer 131, which surface is in contact with the first measurement chamber 121. The pumping electrode 133 is disposed on a surface of the solid electrolyte layer 131 on the side opposite the pumping electrode 132 with respect to the solid electrolyte layer 131. The insulating layer 113 is removed from a region in which the pumping electrode 133 is disposed and from a region around the pumping electrode 133, and the resulting space is filled with a porous material 134 instead of the insulating layer 113. The porous material 134 allows gas (e.g., oxygen) migration between the pumping electrode 133 and the outside.

The element body 31 includes an oxygen concentration detection cell 140. The oxygen concentration detection cell 140 includes a solid electrolyte layer 141, a detection electrode 142, and a reference electrode 143.

The solid electrolyte layer 141 is formed mainly of zirconia having oxygen ion conductivity. A part of the ceramic layer 116 is removed from a region on the rear end side (the right side of FIG. 2) of the solid electrolyte layer 131, and the resulting space is filled with the solid electrolyte layer 141 instead of the ceramic layer 116.

The detection electrode 142 and the reference electrode 143 are formed mainly of platinum. The detection electrode 142 is disposed on a surface of the solid electrolyte layer 141, which surface is in contact with the first measurement chamber 121. The reference electrode 143 is disposed on a surface of the solid electrolyte layer 141 on the side opposite the detection electrode 142 with respect to the solid electrolyte layer 141.

The element body 31 includes a reference oxygen chamber 146. The reference oxygen chamber 146 is a through hole formed by removing the insulating layer 117 from a region in which the reference electrode 143 is disposed and from a region around the reference electrode 143.

The element body 31 includes a second measurement chamber 148. The second measurement chamber 148 is formed rearward of the detection electrode 142 and the reference electrode 143 so as to pass through the solid electrolyte layer 141 and the insulating layer 117. In the element body 31, the exhaust gas discharged from the first measurement chamber 121 is introduced into the second measurement chamber 148.

The element body 31 includes a second pumping cell 150. The second pumping cell 150 includes a solid electrolyte layer 151 and pumping electrodes 152 and 153.

The solid electrolyte layer 151 is formed mainly of zirconia having oxygen ion conductivity. The ceramic layer 118 is removed from a region in contact with the reference oxygen chamber 146 and the second measurement chamber 148 and a region around that region, and the resulting space is filled with the solid electrolyte layer 151 instead of the ceramic layer 118.

The pumping electrodes 152 and 153 are formed mainly of platinum. The pumping electrode 152 is disposed on a surface of the solid electrolyte layer 151, which surface is in contact with the second measurement chamber 148. The pumping electrode 153 is disposed on a surface of the solid electrolyte layer 151 on the side opposite the reference electrode 143 with respect to the reference oxygen chamber 146. A porous material 147 is disposed inside the reference oxygen chamber 146 so as to cover the pumping electrode 153.

The element body 31 further includes a heater 160. The heater 160 is a heat-generating resistor that is formed mainly of platinum and generates heat when energized and is disposed between the insulating layers 119 and 120.

The element body 31 is connected to the sensor control apparatus 170. The sensor control apparatus 170 controls the element body 31 and calculates the NOx concentration in the exhaust gas on the basis of the detection result of the element body 31.

The sensor control apparatus 170 includes a control circuit 180 and a microcomputer 190.

The control circuit 180 is an analog circuit disposed on a circuit board. The control circuit 180 includes an Ip1 drive circuit 181, a Vs detection circuit 182, a reference voltage comparison circuit 183, an Icp supply circuit 184, an Rpvs detection circuit 185, a Vp2 application circuit 186, an Ip2 detection circuit 187, and a heater drive circuit 188.

The pumping electrode 132, the detection electrode 142, and the pumping electrode 152 are connected to a reference potential. The pumping electrode 133 is connected to the Ip1 drive circuit 181. The reference electrode 143 is connected to the Vs detection circuit 182, the Icp supply circuit 184, and the Rpvs detection circuit 185. The pumping electrode 153 is connected to the Vp2 application circuit 186 and the Ip2 detection circuit 187. The heater 160 is connected to the heater drive circuit 188.

The Ip1 drive circuit 181 applies a voltage Vp1 between the pumping electrode 132 and the pumping electrode 133 to supply a first pumping current Ip1 and detects the supplied first pumping current Ip1.

The Vs detection circuit 182 detects the voltage Vs between the detection electrode 142 and the reference electrode 143 and outputs the detection result to the reference voltage comparison circuit 183.

The reference voltage comparison circuit 183 compares a reference voltage (e.g., 425 mV) with the output from the Vs detection circuit 182 (i.e., the voltage Vs) and outputs the comparison result to the Ip1 drive circuit 181. The Ip1 drive circuit 181 controls the direction and magnitude of the first pumping current Ip1 such that the voltage Vs becomes equal to the reference voltage, and adjusts the concentration of oxygen in the first measurement chamber 121 to a predetermined level at which decomposition of NOx does not occur.

The Icp supply circuit 184 causes a weak current Icp to flow between the detection electrode 142 and the reference electrode 143. Oxygen is thereby fed from the first measurement chamber 121 to the reference oxygen chamber 146 through the solid electrolyte layer 141, so that the concentration of oxygen in the reference oxygen chamber 146 is set to a predetermined oxygen concentration serving as a reference.

The Rpvs detection circuit 185 instantaneously supplies a current Ir between the detection electrode 142 of the oxygen concentration detection cell 140 and the reference electrode 143 and detects a voltage Vr generated between the detection electrode 142 and the reference electrode 143 by the supplied current Ir. The microcomputer 190 calculates an internal resistance Rpvs of the oxygen concentration detection cell 140 on the basis of the current Ir and the voltage Vr. Since the internal resistance Rpvs corresponds to the temperature of the oxygen concentration detection cell 140, as well known, the temperature of the oxygen concentration detection cell 140 can be calculated from the internal resistance Rpvs.

The Vp2 application circuit 186 applies a constant voltage Vp2 (e.g., 450 mV) between the pumping electrode 152 and the pumping electrode 153. As a result, in the second measurement chamber 148, NOx is dissociated through the catalytic action of the pumping electrodes 152 and 153 of the second pumping cell 150. The oxygen ions obtained as a result of the dissociation migrate in the solid electrolyte layer 151 between the pumping electrode 152 and the pumping electrode 153, so that a second pumping current Ip2 flows. The Ip2 detection circuit 187 detects the second pumping current Ip2.

The heater drive circuit 188 applies a positive voltage for heater energization to one end of the heater 160, which is a heat-generating resistor, and applies a negative voltage for heater energization to the other end of the heater 160 to thereby drive the heater 160.

The microcomputer 190 includes a CPU 191, a ROM 192, a RAM 193, and a signal input/output section 194.

The CPU 191 executes a process for controlling the NOx sensor 1 according to a program stored in the ROM 192. The signal input/output section 194 is connected to the Ip1 drive circuit 181, the Vs detection circuit 182, the Rpvs detection circuit 185, the Ip2 detection circuit 187, and the heater drive circuit 188.

The CPU 191 calculates the NOx concentration in the exhaust gas and the temperature of the oxygen concentration detection cell 140 on the basis of signals input from the circuits 181, 182, 185, and 187 through the signal input/output section 194. The CPU 191 outputs a drive signal to the heater drive circuit 188 through the signal input/output section 194 to thereby control the heater 160.

Next, an example operation of the gas sensor element 3 will be described.

First, upon start of the sensor control apparatus 170, the sensor control apparatus 170 supplies electricity to the heater 160. The heater 160 heats the first pumping cell 130, the oxygen concentration detection cell 140, and the second pumping cell 150 to an activation temperature.

When the cells 130, 140, and 150 are heated to the activation temperature, the sensor control apparatus 170 causes the first pumping current Ip1 to flow to the first pumping cell 130. By this procedure, the first pumping cell 130 causes migration of oxygen between the pumping electrode 132 and the pumping electrode 133 through the solid electrolyte layer 131, thereby pumping oxygen to or from the exhaust gas which has flown into the first measurement chamber 121.

The sensor control apparatus 170 controls the first pumping current Ip1 caused to flow to the first pumping cell 130 such that the voltage Vs between the detection electrode 142 and the reference electrode 143 of the oxygen concentration detection cell 140 becomes equal to a reference voltage (e.g., 425 mV). The voltage Vs of the oxygen concentration detection cell 140 assumes a value proportional to the oxygen concentration in the detection electrode 142 with the oxygen concentration in the reference oxygen chamber 146 serving as a reference. As a result of this control, the oxygen concentration in the first measurement chamber 121 is adjusted to a value at which decomposition of NOx does not occur.

The exhaust gas whose oxygen concentration has been adjusted in the first measurement chamber 121 flows further toward the second measurement chamber 148.

The sensor control apparatus 170 applies the constant voltage Vp2 between the pumping electrode 152 and the pumping electrode 153 of the second pumping cell 150. This voltage is set to a value at which NOx gas contained in the exhaust gas is decomposed into an oxygen gas and a nitrogen gas. As a result, NOx contained in the exhaust gas is decomposed into nitrogen and oxygen. The second pumping current Ip2 flows to the second pumping cell 150 so as to pump out oxygen generated as a result of decomposition of NOx from the second measurement chamber 148. Since the second pumping current Ip2 and the NOx concentration are in proportional relation, by detecting the value of the second pumping current Ip2, the NOx concentration in the exhaust gas can be detected.

By use of the temperature of the oxygen concentration detection cell 140 calculated on the basis of the internal resistance Rpvs, the sensor control apparatus 170 controls current supply to the heater 160 through the heater drive circuit 188 such that the gas sensor element 3 assumes a target temperature.

The thus-configured NOx sensor 1 includes the gas sensor element 3, the body member 21 made of metal, and the protector 5 made of metal. The gas sensor element 3 is formed in an elongated shape and detects NOx contained in the exhaust gas. The body member 21 is formed in a tubular shape extending in the axial direction DA for accommodating the gas sensor element 3 internally of the same. The protector 5 has the gas introduction holes 5a formed therein for allowing passage of the exhaust gas and is fixed to the body member 21 so as to cover a forward end side FE end portion of the gas sensor element 3.

The NOx sensor 1 includes the attachment member 22 formed in a tubular shape extending in the axial direction DA and disposed such that the non-endless annular space 23 extending in the axial direction DA is formed between the attachment member 22 and the body member 21. The attachment member 22 is disposed in such a manner as to cover at least a portion of the outer circumferential surface of the body member 21 while the space 23 is formed between the attachment member 22 and the body member 21.

The gas sensor element 3 includes the oxygen concentration detection cell 140 having the oxygen ion-conductive solid electrolyte layer 141 and the paired detection electrode 142 and reference electrode 143 formed on the solid electrolyte layer 141, and the heater 160 for heating the oxygen concentration detection cell 140 to a predetermined temperature. The oxygen concentration detection cell 140 is disposed internally of the space 23.

As mentioned above, in the NOx sensor 1, the oxygen concentration detection cell 140 is covered in a surrounded manner with a section (hereinafter, called the "first stack section") where the attachment member 22, the space 23, and the body member 21 made of metal are stacked along the radial direction.

Thus, one channel through which an ambient temperature change of the NOx sensor 1 affects the temperature of the oxygen concentration detection cell 140 is a channel through which ambient heat of the NOx sensor 1 is conducted to the oxygen concentration detection cell 140 by way of the above-mentioned first stack section.

In the first stack section, the space 23 is formed between the attachment member 22 and the body member 21. That is, gas is present between the attachment member 22 and the body member 21 made of metal. Gas is lower in thermal conductivity than metal. Thus, in the NOx sensor 1, ambient heat of the NOx sensor 1 is unlikely to be conducted to the oxygen concentration detection cell 140 by way of the first stack section, whereby a temperature change of the oxygen concentration detection cell 140 can be restrained. As a result of a temperature change of the oxygen concentration detection cell 140 being restrained, a temperature change of the gas sensor element 3 can be restrained.

In the NOx sensor 1, the gas sensor element 3 includes the first measurement chamber 121 and the first pumping cell 130, and the first pumping cell 130 is disposed on the forward end side FE of the gas sensor element 3 with respect to the oxygen concentration detection cell 140 and disposed within the body member 21.

The exhaust gas is introduced into the first measurement chamber 121. The first pumping cell 130 has the oxygen ion-conductive solid electrolyte layer 131 and a pair of the pumping electrodes 132 and 133 formed on the solid electrolyte layer 131 and pumps oxygen from or to the exhaust gas introduced into the first measurement chamber 121 when the first pumping current Ip1 flows between a pair of the pumping electrodes 132 and 133. The oxygen concentration detection cell 140 has the solid electrolyte layer 141, and the detection electrode 142 and the reference electrode 143 formed on the solid electrolyte layer 141, has the detection electrode 142 disposed in such a manner as to face the first measurement chamber 121, and generates an electromotive force proportional to the difference in oxygen concentration between the detection electrode 142 and the reference electrode 143.

As mentioned above, in the NOx sensor 1, since the first pumping cell 130 is disposed within the body member 21, the first pumping cell 130 is radially covered with the body member 21. As a result, in the NOx sensor 1, the body member 21 can restrain ambient heat of the NOx sensor 1 from reaching the first pumping cell 130. Thus, the NOx sensor 1 can further restrain a temperature change of the gas sensor element 3.

Notably, the NOx sensor 1 corresponds to the gas sensor; the gas sensor element 3 corresponds to the detection element; the body member 21 corresponds to the accommodation member; and the gas introduction hole 5a corresponds to the gas passage hole.

The attachment member 22 corresponds to the space formation member; the space 23 corresponds to the non-endless annular space; the solid electrolyte layer 141 corresponds to the solid electrolyte body; the detection electrode 142 and the reference electrode 143 correspond to a pair of electrodes; and the oxygen concentration detection cell 140 corresponds to the detection cell.

The exhaust gas corresponds to the gas under measurement, and NOx corresponds to the particular gas.

The first measurement chamber 121 corresponds to the measurement chamber; the solid electrolyte layer 131 corresponds to the first solid electrolyte body; the pumping electrodes 132 and 133 correspond to the pumping electrodes; the first pumping cell 130 corresponds to the pumping cell; and the solid electrolyte layer 141 corresponds to the second solid electrolyte body.

(Second Embodiment)

A second embodiment of the present disclosure will next be described with reference to the drawings. Description of the second embodiment discusses features different from those of the first embodiment. Common configurational features are denoted by the same reference numerals as those of the first embodiment.

The NOx sensor 1 of the second embodiment differs from that of the first embodiment in the configuration of the metallic shell 2.

Figure 3:
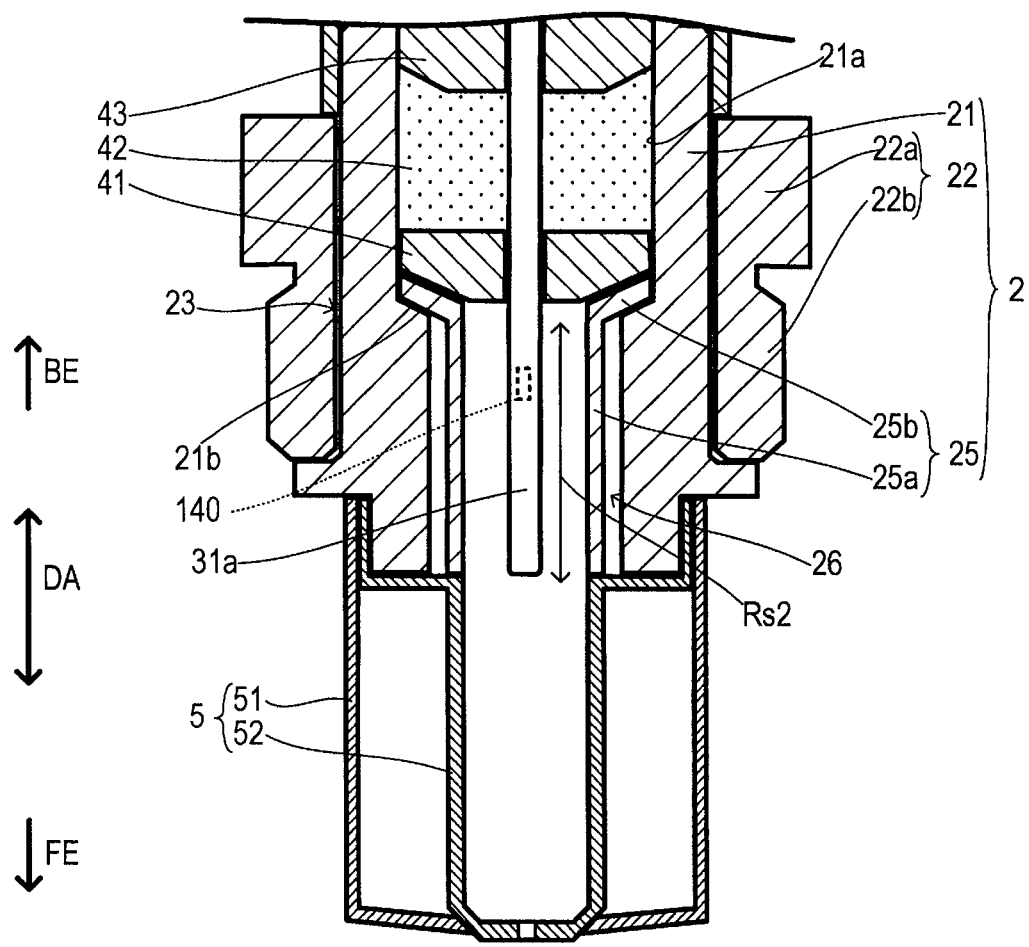
FIG. 3 is a sectional view showing the periphery of a detection section 31a of the NOx sensor 1.

Specifically, as shown in FIG. 3, the metallic shell 2 includes the body member 21, the attachment member 22, and a space formation member 25.

The space formation member 25 is a tubular metal member extending in the axial direction DA. The space formation member 25 includes a cylindrical portion 25a and a diameter expansion portion 25b.

The cylindrical portion 25a is formed into a cylindrical shape such that its diameter is smaller than the diameter of the through hole 21a measured on the forward end side FE of the step portion 21b.

The diameter expansion portion 25b extends from a rear end side BE end of the cylindrical portion 25a such that its diameter increases toward the rear end side BE. The diameter expansion portion 25b is formed such that the diameter of its rear end side BE opening portion is smaller than the diameter of the through hole 21a measured on the rear end side BE of the step portion 21b.

The space formation member 25 is held within the through hole 21a by means of the diameter expansion portion 25b being held between the step portion 21b and the ceramic holder 41. As a result, the cylindrical portion 25a is disposed within the through hole 21a on the forward end side FE of the step portion 21b. A cylindrical space 26 extending in the axial direction DA is formed between the outer circumferential surface of the cylindrical portion 25a and an inner circumferential surface of the through hole 21a.

The oxygen concentration detection cell 140 provided within the detection section 31a is disposed within the through hole 21a of the body member 21 within a range Rs2 where the space 26 is present along the axial direction DA on the forward end side FE of the holding section 4. Notably, the length in the radial direction of the cylindrical portion 25a (i.e., the inside diameter of the cylindrical portion 25a) within the range Rs2 is greater than the length in the radial direction of the threaded portion 22b (i.e., the thickness of the threaded portion 22b) of the body member 21 within the range Rs2.

The thus-configured NOx sensor 1 includes the space formation member 25 formed in a tubular shape extending in the axial direction DA and disposed such that the annular space 26 extending in the axial direction DA is formed between the space formation member 25 and the body member 21. The space formation member 25 is disposed within the body member 21 in such a manner as to cover at least a portion of the inner circumferential surface of the body member 21 while the space 26 is formed between the space formation member 25 and the body member 21.

The oxygen concentration detection cell 140 is disposed such that the space 26 is located on a straight line (hereinafter, called the "radial straight line") passing through the oxygen concentration detection cell 140 along a direction (hereinafter, called the "radial direction") perpendicular to the axial direction DA.

As mentioned above, in the NOx sensor 1, the oxygen concentration detection cell 140 is covered in a surrounded manner with a section (hereinafter, called the "second stack section") where the space formation member 25 made of metal, the space 26, and the body member 21 made of metal are stacked along the radial direction.

Thus, one channel through which an ambient temperature change of the NOx sensor 1 affects the temperature of the oxygen concentration detection cell 140 is a channel through which ambient heat of the NOx sensor 1 is conducted to the oxygen concentration detection cell 140 by way of the above-mentioned second stack section.

In the second stack section, the space 26 is formed between the space formation member 25 and the body member 21. That is, gas is present between the space formation member 25 and the body member 21 made of metal. Gas is lower in thermal conductivity than metal. Thus, in the NOx sensor 1, ambient heat of the NOx sensor 1 is unlikely to be conducted to the oxygen concentration detection cell 140 by way of the second stack section, whereby a temperature change of the oxygen concentration detection cell 140 can be restrained.

Notably, the space 26 corresponds to the annular space.

While the present disclosure has been described with reference to the above one embodiment, the present disclosure is not limited thereto, but may be embodied through various modifications.

For example, in the above embodiment, the space 23 formed between the inner circumferential surface of the attachment member 22 and the outer circumferential surface of the body member 21 is a non-endless annular space; however, the space 23 may be an annular space.

The above embodiment has been described while referring to the NOx sensor for detecting the NOx concentration in exhaust gas as a gas sensor for detecting the concentration of a particular gas contained in a gas under measurement; however, the gas sensor of the present disclosure is not limited to the NOx sensor. The gas sensor of the present disclosure may be a gas sensor having a cell to which a detection current is supplied for detecting an internal resistance. Examples of such a gas sensor include a full range air-fuel ratio sensor.

In the above embodiment, a current is supplied between the detection electrode and the reference electrode of the oxygen concentration detection cell for calculating the internal resistance Rpvs of the oxygen concentration detection cell; however, the present disclosure is not limited thereto. For example, a voltage may be applied, and the internal resistance may be calculated from a current generated as a result of application of the voltage. If a physical quantity interrelating with the internal resistance of the detection element is available, the heater may be driven on the basis of the physical quantity instead of the internal resistance of the detection element.

The above embodiments have been described while referring to the oxygen concentration detection cell 140 disposed within the range Rs1 or the range Rs2. In order to dispose the oxygen concentration detection cell 140 within the range Rs1 or Rs2, the disposition of the gas sensor element 3 within the body member 21 may be changed, or the disposition of the oxygen concentration detection cell 140 within the gas sensor element 3 may be changed without changing the disposition of the gas sensor element 3.

The function of one component in the above embodiments may be distributed to a plurality of components, or the functions of a plurality of components may be realized by one component. Part of the configurations of the above embodiments may be omitted. At least part of the configuration of each of the above embodiments may be added to or partially replace the configurations of other embodiments. All modes included in the technical idea specified by the wording of the claims are embodiments of the present disclosure.

DESCRIPTION OF REFERENCE NUMERALS

1: NOx sensor; 2: metallic shell; 3: gas sensor element; 5: protector; 5a: gas introduction hole; 21: body member; 22: attachment member; 23, 26: space; 25: space formation member; 140: oxygen concentration detection cell; 141: solid electrolyte layer; 142: detection electrode; 143: reference electrode; and 160: heater.

The invention claimed is:

1. A gas sensor comprising:
a detection element formed in an elongated shape and detecting a particular gas contained in a target gas;
a shell including an accommodation member and an attachment member, said accommodation member being made of metal and formed in a tubular shape extending in an axial direction and accommodating the detection element inside thereof, and said attachment member being disposed in such a manner as to cover at least a portion of an outer circumferential surface of the accommodation member; and
a protector made of metal, having a gas passage hole formed therein for allowing passage of the target gas, and fixed to the accommodation member in such a manner as to cover a forward end of the detection element; wherein
the shell is formed in a tubular shape extending in the axial direction and disposed such that a space extending in the axial direction is formed between the attachment member and the accommodation member,
the detection element comprises:
a detection cell having an oxygen ion-conductive solid electrolyte body and a pair of electrodes formed on the solid electrolyte body and
a heater for heating the detection cell to a predetermined temperature, and
the pair of electrodes is disposed such that a forward end of the pair of electrodes is provided rearward in the axial direction from a forward end of the space.

2. The gas sensor according to claim 1, wherein the detection element further comprises:
a measurement chamber into which the target gas is introduced;
a pumping cell having an oxygen ion-conductive first solid electrolyte body and a pair of pumping electrodes formed on the first solid electrolyte body and pumping oxygen from or to the target gas introduced into the measurement chamber when a pumping current flows between the pair of pumping electrodes; and
an oxygen concentration detection cell having an oxygen ion-conductive second solid electrolyte body, and a detection electrode and a reference electrode formed on the second solid electrolyte body, having the detection electrode disposed in such a manner as to face the measurement chamber, and generating an electromotive force proportional to a difference in oxygen concentration between the detection electrode and the reference electrode, wherein
the oxygen concentration detection cell is the detection cell, and
the pumping cell is disposed on a forward end side of the detection element with respect to the oxygen concentration detection cell and disposed within the accommodation member.

3. The gas sensor according to claim 1, wherein the detection cell is entirely disposed radially inside of the space.

4. The gas sensor according to claim 1, wherein a forward-most end of the detection element is surrounded by the shell.

5. The gas sensor according to claim 1, wherein the detection cell is surrounded by a portion where the shell, the space and the accommodation member are stacked along a radial direction.

6. A gas sensor comprising:
a detection element formed in an elongated shape and detecting a particular gas contained in a target gas;
a shell including an accommodation member and a space formation member, said accommodation member being made of metal and formed in a tubular shape extending in an axial direction and accommodating the detection element inside thereof, and said space formation member being disposed within the accommodation member in such a manner as to cover at least a portion of an inner circumferential surface of the accommodation member; and
a protector made of metal, having a gas passage hole formed therein for allowing passage of the target gas, and fixed to the accommodation member in such a manner as to cover a forward end of the detection element; wherein
the shell is formed in a tubular shape extending in the axial direction and disposed such that a cylindrical space extending in the axial direction is formed between the space formation member and the accommodation member,
the detection element comprises:
a detection cell having an oxygen ion-conductive solid electrolyte body and a pair of electrodes formed on the solid electrolyte body and
a heater for heating the detection cell to a predetermined temperature, and
the pair of electrodes is disposed such that a forward end of the pair of electrodes is provided rearward in the axial direction from a forward end of the cylindrical space.

* * * * *